United States Patent
Bank et al.

(10) Patent No.: US 6,783,121 B2
(45) Date of Patent: Aug. 31, 2004

(54) ROLLING-LOBE SPRING

(75) Inventors: Christoph Bank, Lehrte (DE); Paul Cerny, Wennigsen (DE); Gerhard Thurow, Garbsen (DE); Peter Gönnheimer, Weinstadt (DE); Joachim Frey, Schorndorf (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 10/322,736

(22) Filed: Dec. 19, 2002

(65) Prior Publication Data

US 2003/0160368 A1 Aug. 28, 2003

(30) Foreign Application Priority Data

Dec. 22, 2001 (DE) .......................................... 101 63 818

(51) Int. Cl.$^7$ ................................................. F16F 9/04
(52) U.S. Cl. ................................ 267/64.21; 267/64.24
(58) Field of Search ........................... 267/64.19, 64.21, 267/64.23, 64.24, 64.27

(56) References Cited

U.S. PATENT DOCUMENTS

| | | | | |
|---|---|---|---|---|
| 3,244,013 A | * | 4/1966 | Deschner .................. | 267/64.27 |
| 3,819,166 A | * | 6/1974 | Ellis et al. ................ | 267/64.21 |
| 4,690,430 A | * | 9/1987 | Buma ....................... | 267/64.21 |
| 4,784,376 A | * | 11/1988 | Ecktman .................... | 267/64.27 |
| 4,852,861 A | * | 8/1989 | Harris ...................... | 267/64.27 |
| 4,899,995 A | * | 2/1990 | Hoffman et al. ........... | 267/64.27 |
| 5,267,725 A | * | 12/1993 | Wode et al. .............. | 267/64.27 |
| 5,326,082 A | * | 7/1994 | Ecktman et al. .......... | 267/64.27 |
| 5,374,037 A | * | 12/1994 | Bledsoe ................... | 267/64.27 |
| 5,460,354 A | * | 10/1995 | Easter ..................... | 267/64.27 |
| 2003/0151177 A1 | * | 8/2003 | Bank et al. .............. | 267/64.27 |

FOREIGN PATENT DOCUMENTS

| | | |
|---|---|---|
| DE | 3246962 | 6/1984 |
| DE | 3346108 | 7/1985 |

* cited by examiner

*Primary Examiner*—Robert A. Siconolfi
(74) *Attorney, Agent, or Firm*—Walter Ottesen

(57) ABSTRACT

The sleeve-shaped rolling-lobe flexible member (4) of a rolling-lobe spring (2) is made of elastomeric material and is provided with a reinforcement layer. The ends of the sleeve-shaped rolling-lobe flexible member (4) include neither beads nor cores. The rolling-lobe flexible member (4) is attached pressure-tightly to a cover (8) functioning as a connecting part and/or to a roll-off piston (10) of the spring (2). This pressure-tight attachment is achieved in that each clamping region (18, 20) of the connecting part (cover 8 and/or roll-off piston 10) is provided with a drawn-in connecting surface having at least one peripherally-extending raised portion (22, 24). Clamp rings (12, 14) are assigned to corresponding clamping regions (18, 20) of the connecting parts (8, 10). The clamp rings (12, 14) have respective peripherally-extending recesses (26, 28). The peripherally-extending raised portion (22, 24) provided at the attachment surface of the corresponding connecting part (8, 10) and/or the peripherally-extending recesses (26, 28) located in the corresponding clamp rings (12, 14) are configured to have a rectangular cross section whereby a form-tight connection of the reinforcement layer in combination with a redirection thereof results during the clamping process.

6 Claims, 1 Drawing Sheet

ROLLING-LOBE SPRING

BACKGROUND OF THE INVENTION

U.S. Pat. No. 4,657,229 discloses a rolling-lope air spring which includes essentially a sleeve-shaped rolling-lobe flexible member and a roll-off piston. The air spring has at least one clamp assembly for the pressure-tight attachment of the flexible member to the cover and/or to the roll-off piston of the air spring. The clamp assembly comprises at least one connecting part and a clamp ring. The sleeve-shaped rolling-lobe flexible member is made of elastomeric material, and is without a core and has no end beads. The flexible member also has a reinforcement layer.

The sleeve-shaped rolling-lobe springs, which are filled with a compressible or incompressible medium, and especially sleeve-shaped rolling-lobe flexible member air springs, are preferably used in motor vehicles for suspending the chassis thereof against the unevenness of a roadway. Increasingly, sleeve-shaped rolling-lobe flexible member air springs are also coming into use for suspending driver seats, driver housings and industrial mountings.

Usually, the ends of the sleeve-shaped bodies, which are simply configured without end beads, are attached with the aid of metal clamp rings, on the one hand, at the air spring cover and, on the other hand, at the roll-off piston.

According to the state of the art shown in German patent publication 3,246,962 and U.S. Pat. No. 4,657,229, the attachment regions of air spring cover and roll-off piston are configured with recessed or drawn-in attachment surfaces for the purpose of simplifying assembly. At least an axial part section of the drawn-in attachment surface of the roll-off piston provided with peripherally-extending ribs preferably having a triangular cross section.

With the teaching of U.S. Pat. No. 4,657,229, the exclusive friction-tight attachment disclosed in German patent publication 3,246,962 is supplemented and strengthened by a form-tight connection so that the rolling-lobe flexible members are fixedly attached with greater reliability against any disadvantageous axial displacement.

U.S. Pat. No. 5,460,354 discloses attachment means for a sleeve made of elastomeric material. This attachment means includes a clamp ring having a convex rise which corresponds to a connecting part having a concave recess. The sleeve made of elastomeric material is clamped between the clamp ring and the connecting part for the purpose of a pressure-tight attachment so that the elastomeric material is pressed laterally outwardly. In order to achieve a pressure-tight connection, the elastomeric material must be compressed to approximately 50% of its original material thickness. Since the elastomeric material is practically incompressible, there results theoretically an elongation of the clamping region by 100%. Since the flexible sleeve is intended to contain reinforcement layers of cord, this can only mean that either the cord layer is likewise expandable as the elastomeric material or not. In the last case, a 50% thickness reduction leads to a separation of the elastomeric material from the reinforcement layer. Reinforcement layers having a like expandability as the elastomeric material are not suitable for use in air spring rolling-lobe flexible members.

SUMMARY OF THE INVENTION

It is an object of the invention to improve the pull-out strength without damage to the material.

The rolling-lobe spring of the invention includes: a first connecting part; a second connecting part; a sleeve-like, rolling-lobe flexible member arranged between the parts; the flexible member being made of elastomeric material and having a reinforcement layer contained therein; the flexible member having first and second end portions attached to the first and second connecting parts, respectively, and the end portions being devoid of beads and cores; a clamp unit including one of the connecting parts and a clamp ring; the one connecting part having a drawn-in peripherally-extending attachment surface and at least one peripherally-extending raised portion disposed on the attachment surface; the clamp ring having a peripherally-extending recess formed therein and the clamp ring being disposed relative to the attachment surface so that the attachment surface and the clamp ring conjointly define an interface clamping region with the recess facing toward the attachment surface; one of the end portions of the flexible members being disposed in the interface clamping region and being clamped pressure tight between the clamp ring and the stop surface; and, at least one of the raised portion and the recess having a rectangular cross section so as to cause the reinforcement layer to be reorientated when the clamp ring is clamped tightly against the attachment surface with the one end portion being clamped form tightly therebetween.

The connecting parts, which are assigned to the upper and lower end sections of the sleeve-shaped rolling-lobe flexible member, are provided with peripherally-extending raised portions of rectangular cross section in an axial subregion of the drawn-in clamping region. A peripherally-extending recess is provided in the corresponding clamp ring.

In this way, a reorientation of the sleeve-shaped rolling-lobe flexible member including its reinforcement layer is realized. With this reorientation, the sleeve-shaped rolling-lobe flexible member is neither squeezed nor expanded. For this reason, there is not the danger of a separation of the rolling-lobe flexible member material from the reinforcement layer which, for example, can be in the form of reinforcing cords. Damage is in no way to be feared.

Even though the rolling-lobe flexible member is only slightly clamped for the end attachment, but is not squeezed, it has been shown against all expectations that the attachment is also well suited for higher pressures. The following specific dimensions have been shown to be preferred dimensions: the clamp ring has a width of approximately 3 mm; the flexible member has a thickness (b); the clamp ring has a height of approximately 3.5(b); the recess of the clamp ring is at a first distance of 3.5(b) from one end of the clamp ring and a second distance of 0.5(b) from the other end of the clamp ring; and, the recess has a depth of approximately (0.5)(b). The raised portion has a radial height of approximately 0.5(b); the raised portion has a width of approximately 1.5(b); and, the raised portion is at a distance of approximately 3.5(b) to the end of the attachment surface.

With the introduction of a support bell, which encloses the sleeve-shaped rolling-lobe flexible member, the tensile strength of the end attachments of the flexible member is further improved.

BRIEF DESCRIPTION OF THE DRAWINGS

The invention will now be described with reference to the drawings wherein.

DESCRIPTION OF THE PREFERRED EMBODIMENTS OF THE INVENTION

Figures 1, 2, 3:
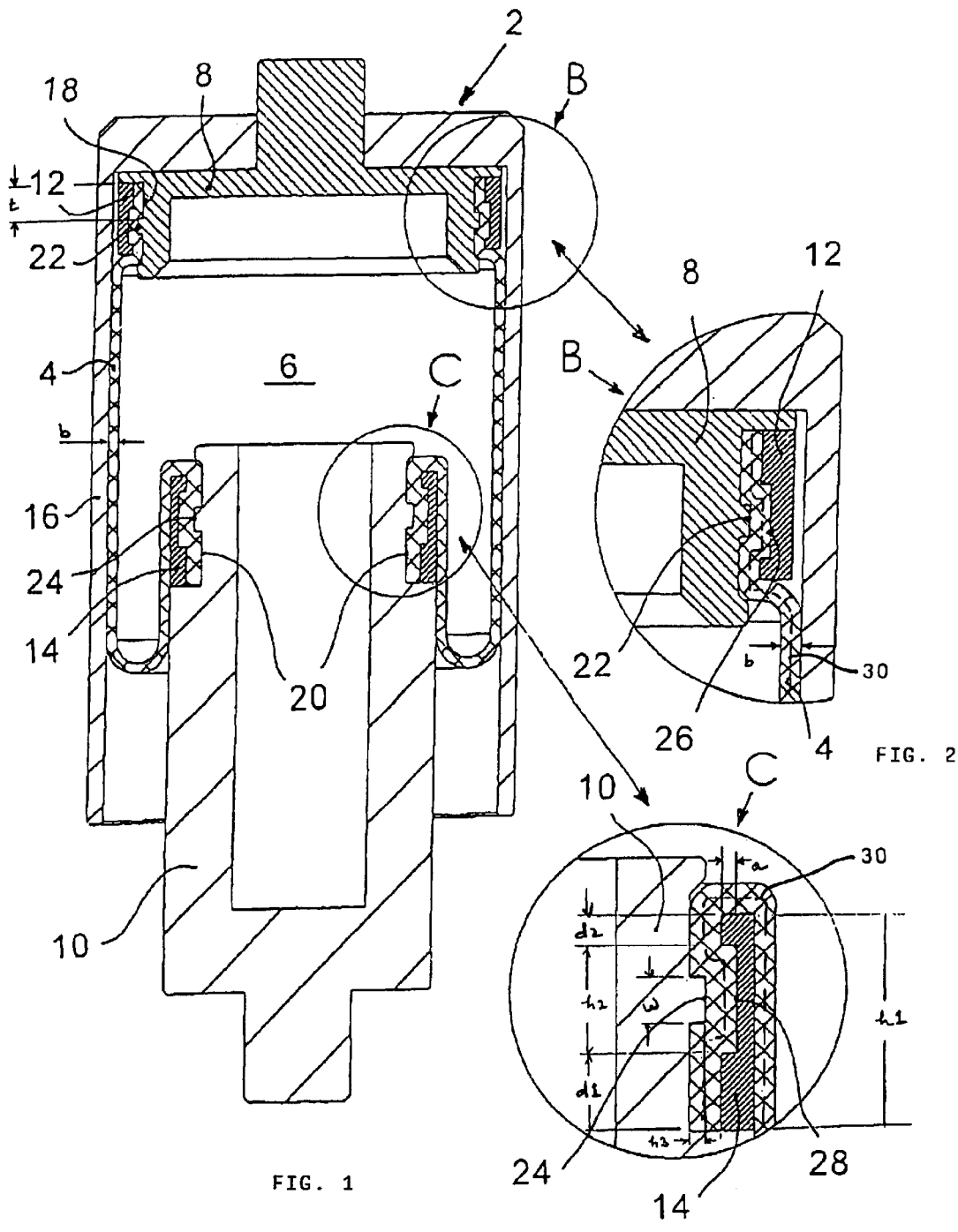
FIG. 1 is an elevation view, in section, of a rolling-lobe air spring which has a clamp contour on the cover and on the roll-off piston.
FIG. 2 is an enlarged view of detail B of FIG. 1.
FIG. 3 is an enlarged view of the detail C of FIG. 1.

The rolling lobe flexible member air spring 2 shown in FIG. 1 includes a rolling-lobe flexible member 4 which laterally delimits the air spring interior space 6. The rolling-lobe flexible member 4 has a thickness (b) and is manufactured as a simple sleeve-shaped body without end beads.

At its first end, the rolling-lobe flexible member 4 is pressure-tightly at ached to a cover 8 with the aid of a clamp ring 12 and at its second end, the flexible member 4 is attached to a roll-off piston 10 with the aid of a clamp ring 14.

Cover 8 and flexible member 4 are enclosed by a support bell 16. The connecting parts (cover 8 and roll-off piston 10) are assigned to the first and second ends of the flexible member and include respective drawn-in clamping regions 18 and 20. The clamping regions 18 and 20 are provided in at least an axial subregion thereof with peripherally-extending raised portions 22 and 24, respectively. The raised portions 22 and 24 preferably have rectangular cross sections.

The clamp ring 12 is shown in detail B of FIG. 2 and the clamp ring 14 is shown in detail C of FIG. 3. Peripherally-extending recesses 26 and 28 are provided in clamp rings 12 and 14, respectively, and each recess preferably has a rectangular cross section. The combination of the peripherally-extending raised portion 22 in the clamping region 18 of the connecting part 8 and a recess 26 in the corresponding clamp ring 12 and the combination of a peripherally-extending raised portion 24 in the clamping region 20 of the connecting part 10 and a corresponding recess 28 in the assigned clamp ring 14 effect not only a form-locking connection in the assembly of the flexible member but, in addition, effect a reorientation of the reinforcement layer as shown by the broken line 30 which schematically represents this reinforcement layer in FIGS. 2 and 3. In this way, a mechanically stable and pressure-tight attachment is considerably improved. The sleeve-shaped rolling-lobe flexible member 4 is fixed against every disadvantageous axial displacement in this way.

The following geometric lengths and width relationships have been shown to be advantageous, inter alia, for the configuration of the clamp rings (12, 14): the clamp ring width or thickness should be approximately 3 mm. The height (h1) of the clamp rings (12, 14) should be approximately 7 times the flexible member wall thickness (b).

The height (h2) of the rectangularly-shaped recesses (26, 28) in the clamp rings (12, 14) should be approximately 3.5×(b). The recess (26, 28) should be a distance (d1) of 3.5(b) from the one end of the clamp ring (12, 14) and should be a distance (d2) of 0.5×(b) from the other end thereof.

The depth (a) of the rectangular-shaped recesses (26, 28) in the clamp rings (12, 14) should correspond approximately to 0.5×(b).

For the configuration of the connecting parts (roll-off piston 10 and cover 8), the following dimensions have been shown to be advantageous: the peripherally-extending raised portions (22, 24) have a height (h3) of approximately 0.5×(b) measured radially. The width (w) of the raised portions (22, 24) is approximately 1.5×(b) measured axially. The axial distance (t) of the raised portions (22, 24) to the drawn-in clamping regions (18, 20) should be approximately 3.5×(b).

It is understood that the foregoing description is that of the preferred embodiments of the invention and that various changes and modifications may be made thereto without departing from the spirit and scope of the invention as defined in the appended claims.

What is claimed is:

1. A rolling-lobe spring comprising:

a first connecting part;

a second connecting part;

a sleeve-like rolling-lobe flexible member arranged between said parts;

said flexible member being made of elastomeric material and having a reinforcement layer contained therein;

said flexible member having first and second end portions attached to said first and second connecting parts, respectively, and said end portions being devoid of beads and cores;

a clamp unit including one of said connecting parts and a clamp ring;

said one connecting part having a drawn-in peripherally-extending attachment surface and at least one peripherally-extending raised portion disposed on said attachment surface;

said clamp ring having a peripherally-extending recess formed therein and said clamp ring being disposed relative to said attachment surface so that said attachment surface and said clamp ring conjointly define an interface clamping region with said recess facing toward said attachment surface;

one of said end portions of said flexible member being disposed in said interface clamping region and being clamped pressure tight between said clamp ring and said attachment surface so as to neither squeeze nor expand said flexible member whereby a separation of paid elastomeric material from said reinforcement layer is precluded and, at least one of said raised portion and said recess having a rectangular cross section so as to cause said reinforcement layer to be reorientated when said clamp ring is clamped tightly against said attachment surface with said one end portion being clamped form tightly therebetween.

2. The spring of claim 1, wherein:

said clamp ring has a thickness of approximately 3 mm;

said flexible member has a thickness (b);

said clamp ring has a height of approximately 7(b);

said recess of said clamp ring is at a first distance of 3.5(b) from one end of said clamp ring and a second distance of 0.5(b) from the other end of said clamp ring; and, said recess has a depth of approximately (0.5)(b).

3. The spring of claim 2, wherein:

said raised portion has a radial height of approximately 0.5(b);

said raised portion has a width of approximately 1.5(b); and, said raised portion is at a distance of approximately 3.5(b) to the end of said attachment surface.

4. The spring of claim 1, further comprising a support bell laterally enclosing said flexible member.

5. The spring of claim 4, wherein said support bell encloses said flexible member so as not to be fixedly attached thereto.

6. The spring of claim 1, wherein both said raised portion and said recess have a rectangular cross section.

* * * * *

UNITED STATES PATENT AND TRADEMARK OFFICE
CERTIFICATE OF CORRECTION

PATENT NO. : 6,783,121 B2
DATED : August 31, 2004
INVENTOR(S) : Christoph Bank et al.

It is certified that error appears in the above-identified patent and that said Letters Patent is hereby corrected as shown below:

Column 1,
Line 5, delete "lope" and substitute -- lobe -- therefor.
Line 12, delete "material," and substitute -- material -- therefor.
Line 34, -- is -- should be inserted before "provided".

Column 3,
Line 10, delete "at ached" and substitute -- attached -- therefor.

Column 4,
Line 34, delete "paid" and substitute -- said -- therefor.
Line 35, delete "precluded" and substitute -- precluded; -- therefor.

Signed and Sealed this

Fourteenth Day of December, 2004

JON W. DUDAS
*Director of the United States Patent and Trademark Office*